(12) United States Patent
Mezer et al.

(10) Patent No.: US 7,747,292 B2
(45) Date of Patent: Jun. 29, 2010

(54) TECHNIQUES FOR ADAPTIVE INTERFERENCE CANCELLATION

(75) Inventors: Amir Mezer, Haifa (IL); Yaniv Hadar, Even Yehuda (IL); Ehud Shoor, Haifa (IL)

(73) Assignee: Intel Corporation, Santa Clara, CA (US)

(*) Notice: Subject to any disclaimer, the term of this patent is extended or adjusted under 35 U.S.C. 154(b) by 759 days.

(21) Appl. No.: 11/585,588

(22) Filed: Oct. 24, 2006

(65) Prior Publication Data

US 2008/0096512 A1 Apr. 24, 2008

(51) Int. Cl.
*H04B 1/38* (2006.01)
*H04K 3/00* (2006.01)

(52) U.S. Cl. ............... 455/570; 455/295; 455/296; 370/286; 379/406.01

(58) Field of Classification Search ......... 455/295–296, 455/570; 370/286, 289–292; 375/346; 379/406.1, 379/406.5, 406.6, 406.8
See application file for complete search history.

(56) References Cited

U.S. PATENT DOCUMENTS 5,920,220 A * 7/1999 Takao et al. ............. 327/233
6,240,128 B1 * 5/2001 Banerjea et al. .......... 375/222

* cited by examiner

*Primary Examiner*—Lee Nguyen
(74) *Attorney, Agent, or Firm*—Kacvinsky LLC (57) ABSTRACT

Techniques to perform adaptive interference cancellation are described. A first apparatus may include a timing recovery module to produce a timing recovery command signal, an interference canceller to receive an interference reference signal and produce an interference canceller signal, and an interpolator to couple to the timing recovery module and the interference canceller, the interpolator to receive the timing recovery command signal and the interference canceller signal and produce an interpolated interference canceller signal. A second apparatus may include a time-domain interference canceller to receive an interference reference signal and produce a time-domain interference canceller signal and a frequency-domain interference canceller to receive the interference reference signal and produce a frequency-domain interference canceller signal. Other embodiments are described and claimed.

15 Claims, 9 Drawing Sheets

TECHNIQUES FOR ADAPTIVE INTERFERENCE CANCELLATION

BACKGROUND

A communications system typically includes multiple devices communicating with each other over some communication medium. Each device typically includes a transmitter to send information and a receiver to receive information. When performing full duplex communications, the transmitter for a given device may generate an echo signal that is received by the receiver of the same device. As a result, a technique referred to as echo cancellation may be used to suppress or cancel the echo signals. Echo cancellation involves recognizing the originally transmitted signal that appears after passing through a physical medium, with some delay, in the received signal. Once the echo is recognized, it may be partially or wholly removed by subtracting it from the received signal. This technique is generally implemented with the aid of digital signal processing (DSP).

Echo cancellation is usually performed on the sampled analog echo signal, which is the outcome of the transmitted echo signal after passing through a physical medium (channel). In many cases, however, the sampling point constantly changes due to clock imperfections, analog imperfections, intentional changes of the sampling phase due to timing recovery performed in the system, and other factors. Consequently, it is necessary to constantly adapt the echo cancellers in order to adjust to the changing sampled echo signal, in order to provide good echo cancellation or suppression in a device or network.

In addition, echo cancellation needs to be efficient. For example, higher speed communication networks may require increased hardware performance. In another example, smaller form factor devices may drive the need for a decrease in power requirements. Consequently, it is necessary to efficiently perform echo cancellation or suppression in a device or network.

DETAILED DESCRIPTION

Various embodiments may be generally directed to communication systems. Some embodiments may be particularly directed to various interference cancellation architectures to reduce or eliminate interference signals in a communications device or network. Examples of an interference signal may include echo signals, near-end cross talk (NEXT) signals, far-end cross-talk (FEXT) signals, and so forth (collectively referred to herein as "interference"). Other examples of interference signals may be provided further below. Some embodiments, for example, may be directed to a timing recovery compensation interference cancellation architecture. Some embodiments, for example, may be directed to a hybrid time-frequency interference cancellation architecture. Some embodiments, for example, may be directed to both.

Some embodiments may be directed to a timing recovery compensation interference cancellation architecture. In one embodiment, for example, a first apparatus may include a timing recovery module to produce a timing recovery command signal, an interference canceller to receive an interference reference signal and produce an interference canceller signal, and an interpolator to couple to the timing recovery module and the interference canceller, the interpolator to receive the timing recovery command signal and the interference canceller signal and produce an interpolated interference canceller signal to compensate for phase shifts due to timing recovery commands in the sampled interference signal. The interference canceller may be coupled to the received signal to produce a suppressed interference signal after coupling. The interpolated canceller output, where the timing recovery commands have been used to compensate for phase shifts in the sampling phase, may provide enhanced interference suppression capabilities. Other embodiments are described and claimed.

A timing recovery compensation interference cancellation architecture may provide several advantages over conventional systems. For example, an interference canceller module may use timing recovery information to provide enhanced performance as measured by interference suppression ability, tracking ability and amount of residual error in the system. In another example, an interference canceller module may be implemented to reduce overall power requirements for the system by reducing complexity and processing requirements. Although the use of an interpolator does require additional hardware or software elements, the adaptation of a relative high number of interference canceller taps and associated flip-flop toggling in conventional systems consumes significantly higher power and may have inferior suppression capabilities. This toggling is reduced to an almost zero level since the amount of adaptation necessary after the compensation is substantially reduced. The interpolator may be used to perform a majority of the adaptation and correction needed to compensate for changes in a given interference channel. Interpolation operations may be used to perform a majority of the correction task, while any remaining correction may be performed using additional adaptation algorithms.

Some embodiments may be directed to a hybrid time-frequency interference cancellation architecture. Embodiments directed to a hybrid time-frequency interference canceller architecture attempt to gain the advantages of both time-based interference cancellation techniques and frequency-domain interference cancellation techniques by combining both techniques into an integrated system. The appropriate technique may then be applied to various parts of an interference signal. In one embodiment, for example, a second apparatus may implement a hybrid time-frequency interference canceller architecture. The second apparatus may include a mechanism which uses an interference reference signal to determine positions of dominant interference reflections in the time domain (e.g., at a first position or during the first time period) and produces a time-domain interference canceller signal and a frequency-domain interference canceller signal (e.g., at a first and/or second position or during a first and/or second time period). These are used to suppress the interference. Other embodiments are described and claimed.

A hybrid time-frequency interference canceller architecture may provide several advantages. For example, a hybrid time-frequency interference canceller architecture may tailor a hybrid time-frequency solution to address the characteristic interference channel for a given communication system, which, for example, may include sparse regions of high magnitude.

A hybrid time-frequency interference canceller architecture provides an advantage that presents a lower power solution while maintaining adaptive interference cancellation capabilities. Frequency domain interference cancellation typically consumes significantly less power than time domain interference cancellation, particularly when the required number of time-domain taps is large. In some channels, it may be possible to perform a portion of the interference cancellation for an interference signal using frequency domain interference cancellation techniques to take advantage of the lower power consumption, and perform a portion of the interference cancellation for the interference signal using time domain interference cancellation techniques to provide higher interference cancellation performance. An example of one such case is when the channel includes sparse narrow regions of high magnitude at a small number of discrete positions, and the rest of the channel has lower magnitude regions. This is often the case in the interference channels of full duplex systems that have distinct impedance mismatch points along the physical medium.

A hybrid time-frequency interference canceller architecture also provides an advantage in reduced convergence time compared to conventional interference canceller solutions. The reason is that in the first stage only a relatively small number of taps are converging at the same time, thereby avoiding excessive self-generated error, and allowing the later convergence of the massive amount of taps to be executed at a much better signal-to-noise ratio (SNR). Consequently, a hybrid time-frequency interference canceller architecture offers reduced power requirements and enhanced performance as measured by interference suppression ability, adaptation ability, convergence time and amount of residual error in the system.

Referring now to the drawings, various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
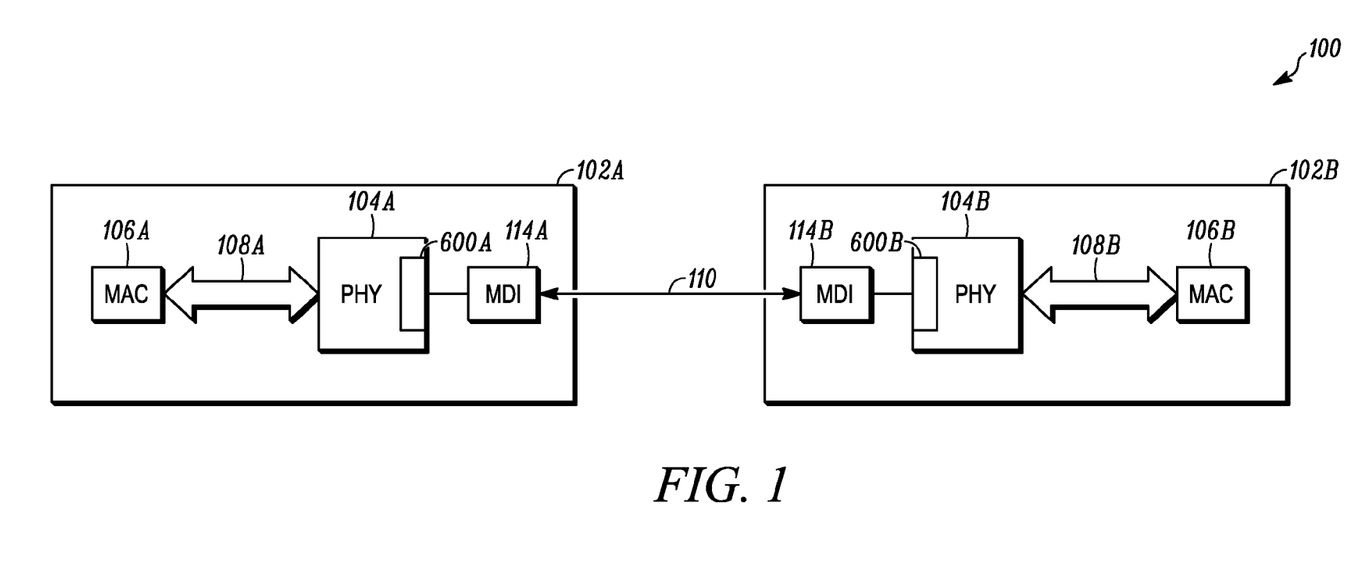
FIG. 1 illustrates one embodiment of a first system.
Figure 3:
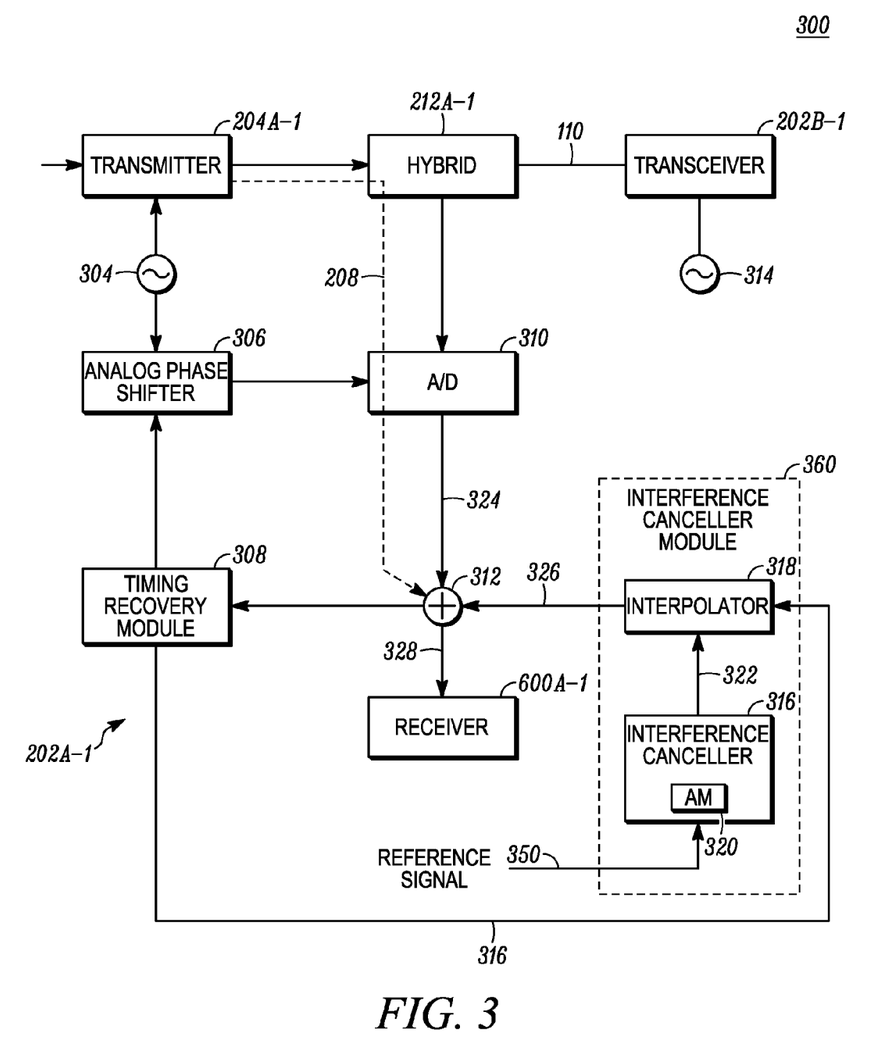
FIG. 3 is one embodiment of a first apparatus.

FIG. 1 is a block diagram of a system 100 provided in accordance to various embodiments. System 100 may comprise a first network interface 102A and a second network interface 102B coupled over a communication channel 110 physical medium. Communication channel 110 physical medium may comprise a standard cable (not separately shown) such as a Gigabit Ethernet cable, for example. Network interfaces 102A, B may comprise respective physical (PHY) units 104A, B and respective media access control (MAC) units 106A, B. PHY units 104A, B are coupled to MAC units 106A, B via respective bidirectional links 108A, B. Although not separately indicated in the drawing, network interfaces 102A, B may comprise transceivers, hybrids, digital signal processors, and other components. In one embodiment, PHY units 104A, B may comprise transceivers, hybrids and a digital signal processor. PHY and MAC units may be implemented as independent units or an integrated unit. In one embodiment, PHY units 104A, B may comprise respective receivers 600A, B. Each receiver 600A, B may comprise an adaptive digital interference canceller module as shown in FIG. 3, for example. Receivers 600A, B may be configured such that the adaptive interference cancellers may be adapted in accordance with the various embodiments of adaptation techniques or processes described herein. In one embodiment, for example, adaptive interference canceller adaptively filters a noise reference input to match and subtract out noise or interference from a primary input signal. In various embodiments, network interfaces 102A, B may be part of a computer system and may be coupled to a general purpose processor to which other components such as volatile and non-volatile memory devices, mass storage, and input/output devices may be coupled.

Network interfaces 102A, B may allow devices coupled thereto to communicate information over a network. In various embodiments, network interfaces 102A, B may represent any network interface suitable for use with a number of different Ethernet techniques as defined by the Institute of Electrical and Electronics Engineers (IEEE) 802.3 series of standards. For example, network interfaces 102A, B may comprise a structure arranged to operate in accordance with the IEEE 802.3-2005 standard. The IEEE 802.3-2005 standard defines 1000 megabits per second (Mbps) operations (1000BASE-T) using four pair twisted copper Category 5 wire, 10 Gbps operations using fiber cable, and 10 Gbps operations (10GBASE-CX4) using copper twinaxial cable (collectively referred to herein as "Gigabit Ethernet"). More particularly, network interfaces 102A, B may have a structure arranged to operate in accordance with the IEEE Standard 802.3-2005 titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications, Amendment: Ethernet Operation over Electrical Backplanes," Draft Amendment P802.3ap/Draft 2.1, 2005 ("Backplane Ethernet Specification"). Network interface 102A, B, however, is not necessarily limited to the techniques defined by these standards, and network interfaces 102A, B may use other techniques and standards as desired for a given implementation. The embodiments are not limited in this context.

Still more particularly, network interfaces 102A, B may have a structure arranged to operate in accordance with the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBAE-T," Draft Amendment P802.3an/Draft 3.1, 2005 ("10GBASE-T Specification"). Network interface 102A, B, however, is not necessarily limited to the techniques defined by these standards, and network interfaces 102A, B may use other techniques and standards as desired for a given implementation. The embodiments are not limited in this context.

As shown in FIG. 1, network interfaces 102A, B may include respective MAC units 106A, B and PHY units 104A, B. In various embodiments, MAC units 106A, B and/or PHY units 104A, B may be arranged to operate in accordance with one of the Ethernet architectures as previously described, such as the IEEE 802.3-2005 series of standards including the 10GBASE-T and/or Backplane Ethernet Specification. Although FIG. 1 illustrates system 100 with a limited number of elements, it may be appreciated that system 100 may include more or less elements in different topologies and still fall within the scope of the embodiments. The embodiments are not limited in this context.

In one embodiment, for example, MAC units 106A, B and/or PHY units 104A, B may be arranged to operate in accordance with the 10GBASE-T and/or the Backplane Ethernet Specification, for example. Backplane Ethernet combines the IEEE 802.3 MAC and MAC Control sublayers with a family of Physical Layers defined to support operation over a modular chassis backplane. Backplane Ethernet supports the IEEE 802.3 MAC operating at 1000 Mbps and/or 10 Gbps. For 1000 Mbps operation, the family of 1000BASE-X PHY signaling systems is extended to include 1000BASE-KX. For 10 Gbps operation, two PHY signaling systems are defined. For operation over four logical lanes, the 10GBASE-X family is extended to include 10GBASE-KX4. For serial operation, the 10GBASE-R family is extended to include 10GBASE-KR (e.g., using various serializer/deserializer or "SERDES" techniques). Backplane Ethernet also specifies an Auto-Negotiation function to enable two devices that share a backplane link segment to automatically select the best mode of operation common to both devices.

It will be appreciated by those skilled in the art that 10GBASE-T is a standard proposed by the IEEE 802 committee to provide 10 Gigabit/second connections over conventional unshielded twisted pair cables. The committee currently working on the standard is IEEE 802.3an, a subgroup of IEEE 802.3. To run multi-gigabit data rates on four-pair copper cabling, however, it may be necessary to employ sophisticated digital signal processing techniques to reduce, suppress or otherwise eliminate the effects of interference, such as near-end cross-talk (NEXT) and far-end cross-talk (FEXT) between pairs of cable and to remove the effects of near-end and far-end signal reflections, and other interference signals as well. Elimination of noise that is external to the cable, such as electromagnetic interference from outside sources or adjacent cables, is difficult. Cable-to-cable noise, or alien cross-talk, for example, prevents wiring from reliably operating under worst-case 100 meter conditions. Accordingly, to support a suitable cabling system for 10GBASE-T, a new PHY, which interfaces with existing 10G MAC and Gigabit Media Independent Interface (GMII) in the IEEE model, is proposed. The PHY contains the functions to transmit, receive, and manage encoded signals that are recovered from cabling systems. The PHY may be based, for example, on pulse amplitude modulation (PAM) encoding to encode information as a stream of pulses with discrete amplitudes. This is the same type of modulation currently used in 100Base-T and 1000Base-T, but the symbol rates and digital signal processing techniques are enhanced.

With reference to the seven-layer Open System Interconnect ("OSI") Reference Model developed by the International Standards Organization ("ISO"), MAC units 106A, B implement MAC layer operations. The MAC layer is a sublayer of the data link layer. The data link layer is primarily concerned with transforming a raw transmission facility into a communication line free of undetected transmission errors for use by the network layer. The data link layer accomplishes this task by breaking input data into data frames, transmitting the data frames sequentially, and processing acknowledgement frames. The MAC sublayer provides additional functionality concerned with controlling access to broadcast networks (e.g., Ethernet). In the case of Ethernet architecture, for example, the MAC sublayer may implement a CSMA/CD protocol.

In various embodiments, MAC units 106A, B are coupled to respective PHY units 104A, B via respective bi-directional links 108A, B to provide data paths between MAC units 106A, B and respective PHY units 104A, B. Bi-directional links 108A, B are often referred to as a Media Independent Interface ("MII"), an xMII in the case of implementations of 100 Mbps or higher, X attachment unit interface ("XAUI") in the case of 10 Gbps implementations, or X fiber interface ("XFI") in the case of dual path 10 Gbps implementations. In one embodiment, for example, bi-directional links 108A, B may comprise a 10 Gbps MII (XGMII) when MAC units 106A, B and/or PHY units 104A, B are implemented for serial operations in accordance with 10GBASE-KR as defined by the Backplane Ethernet Specification. Bi-directional links 108A, B may use a 4-octet wide data path, for example, when implemented as an XGMII bi-directional link. In one embodiment, for example, bi-directional links 108A, B may comprise a XAUI link where the XGMII from MAC units 106A, B is extended through a XGXS sublayer (e.g., XGMII extender sublayer) which provides XGMII on both sides with XAUI used therebetween to extend it. The embodiments are not limited in this context.

In various embodiments, PHY units 104A, B implement physical layer operations. The physical layer is primarily concerned with transmitting raw bits over physical medium, e.g., communication channel 110 physical medium, which may be some form of network. PHY units 104A, B are coupled to communication channel 110 physical medium via respective media dependent interfaces (MDI) units 114A, B, for example. Communication channel 110 physical medium may include various physical communications media, such as an optical fiber, a twisted pair conductor, or the like. In one embodiment, for example, communication channel 110 physical medium is a four pair twisted conductor, such as copper, conforming to a Category 5, 6, 7 or the like cable. In the four pair twisted conductor embodiment, PHY units 104A, B converts digital data received from respective MAC units 106A, B (e.g., 1000BASE-X or 10GBASE-X) into analog symbols (e.g., 1000BASE-T or 10GBASE-T) for transmission over communication channel 110 physical medium. For example, PHY units 104A, B may encode the digital data using Manchester encoding or the like. Communication channel 110 physical medium may operate at any number of bandwidths, including 100 Mbps, 1 Gbps, 10 Gbps, and so forth. PHY units 104A, B may be connected or coupled to communication channel 110 physical medium using any connectors suitable for a given type of communications media, such as an electrical connector, optical connector, and so forth. In one embodiment, for example, PHY units 104A, B may be connected or coupled to communication channel 110 physical medium to support operation over differential, controlled impedance traces on a printed circuit board with two or more connectors and total length up to at least 1 m in accordance with the Backplane Ethernet Specification. The embodiments are not limited in this context.

In various embodiments, PHY units 104A, B may further implement operations for various sublayers of the physical layer, including a physical coding sublayer ("PCS"), a physical medium attachment ("PMA") sublayer, and a physical medium dependent ("PMD") sublayer. In one embodiment, for example, PHY units 104A, B may implement FEC operations for the various sublayers, such as used between the PMA sublayer and PCS sublayer, for example. First and second network interface units 102A, B and corresponding components and channel impairments may be described in more detail with reference to FIG. 2.

Figure 2:
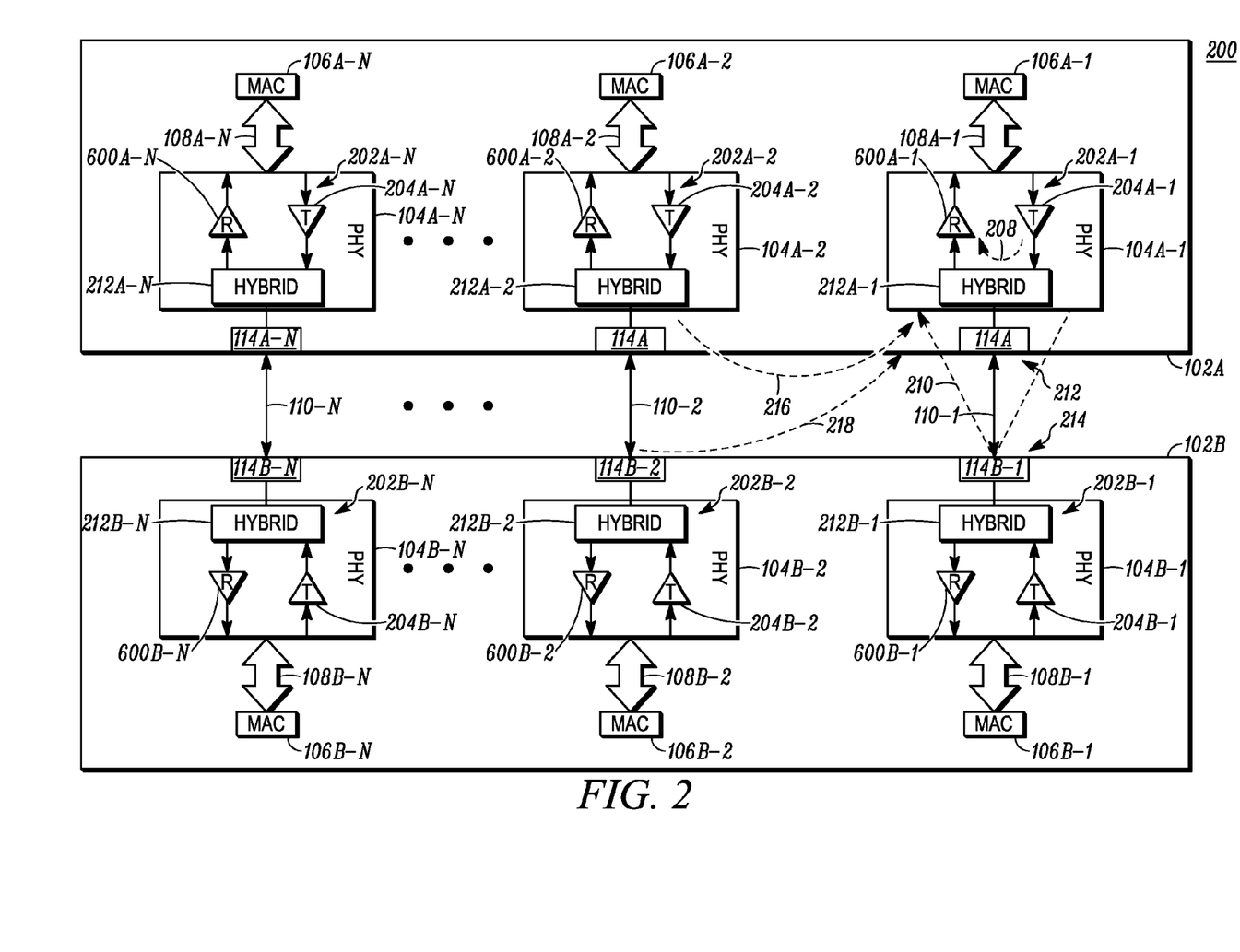
FIG. 2 illustrates one embodiment of a second system.

FIG. 2 is a block diagram 200 of one embodiment of system 100 shown in FIG. 1. Diagram 200 of system 100 illustrates channel impairments such as near-end and far-end interference, NEXT, FEXT, echo signals, and so forth, among other forms or types of communication channel impairments. Communication in system 100 occurs when signals are transmitted and received between network interfaces 102A, B over communication channel 110 physical medium. Communication channel 110 physical medium may be adapted for full duplex communication although it is not limited in this context. In one embodiment, communication channel 110-1-n physical media may comprise multiple cables, for example, wherein each cable may comprise, for example, copper twisted wire pairs. In one embodiment n=4 and communication channel 110 physical medium may comprise four twisted wire pairs 110-1-4, for example. In one embodiment, for each parallel communication channel 110-1-n physical medium network interfaces 102A, 102B may comprise, for example, corresponding PHY units 104A-1-n, 104B-1-n coupled to respective MAC units 106A-1-n, 106B-1-n, over respective bidirectional links 108A-i-n, 108B-1-n, for example. PHY units 104A-1-n, 104B-1-n may comprise transceivers 202A-1-n, 202B-1-n. Transceivers 202A-1-n, 202B-1-n each may comprise respective transmitters (T) 204A-1-n, 204B-1-n and receivers (R) 600A-1-n, 600B-1-n, which may be coupled to respective communication channels 110-1-n physical media via respective hybrid units 212A-1-n, 212B-1-n. Concurrent full duplex transmission on all communication channels 110-1-n physical media, however, may lead to channel impairments such as, for example, signal attenuation, interference, crosstalk, among other impairments due to the characteristics of the physical medium.

Although communication across communication channel 110-1-n physical media may be concurrent full duplex, in the following illustrative examples of channel impairments, assume that transmitter 204A-1 is transmitting information through communication channel 110-1 physical medium to receiver 600B-1 and transmitter 204A-2 is transmitting information through communication channel 110-2 physical medium to receiver 600B-2. Accordingly, in the example illustrated in FIG. 2, interference is a reflection of a transmitted signal back to transmitter 204A-1 due to impedance mismatch in various points of communication channel 110-1 physical medium, hybrid units 212A-1, 212B-1, and MDI units 114A-1, 114B-1. Interference may manifest itself as a near-end interference signal 208 and a far end interference signal 210, for example. In the illustrated embodiment, near-end 212 refers to transmitter 204A-1 side and far-end 214 refers to receivers 600B-1, 600B-2 side. The terms near-end 212 and far-end 214 are used herein merely to describe a signal from the reference point of a corresponding transmitter and the path of the transmitted signal. Each path of near- and far-end interference signals 208, 210 may be considered an interference-channel. Crosstalk is an unwanted signal caused by the interference between adjacent wire pairs in communication channel 10-1-n physical media. In one embodiment, for example, four wire pairs may be used as communication channel 110-1-4 physical media and any adjacent wire pairs in communication channel 100-1-4 physical media may be affected by crosstalk, for example. Crosstalk may be characterized as NEXT interference signal 216 or FEXT interference signal 218. NEXT interference signal 216 is crosstalk that appears at the input of a wire pair at near-end 212, e.g., at receiver 600A-1 input, from transmitter 204A-2 at near-end 212 of communication channel 110-2 physical medium. FEXT interference signal 218 is crosstalk that appears at the input of a wire pair at near-end 212, at receiver 600A-1 input, from far-end 214 of communication channel 100-2 physical medium. Near-end and far-end crosstalk and interference signals may be removed by employing techniques described and illustrated herein. For example, near-end and far-end crosstalk and interference signals may be removed or substantially eliminated by employing an adaptive interference canceller to adaptively filter the noise reference input to maximally match and subtract out noise or interference from a primary input signal (e.g., desired signal plus noise).

In various embodiments, a signal may be passed between network interfaces 102A, B in system 100 through communication channel 110 physical medium. Communication channel 110 physical medium, however, may introduce interference signals such as, for example, ISI and an additional interference signal. The additional interference signal may comprise near-end interference signal 208, far-end interference signal 210, NEXT interference signal 216, FEXT interference signal 218, among other unwanted interference signals that may impair communications in communication channel 110 physical medium. Near-end interference signal 208 may be defined as an interference signal transmitted by a near-end 212 device such as transmitter 204A-1, which has passed through an interference channel, for example. Although not shown in FIG. 2, receivers 600A, B may also include analog-to-digital (A/D) converters. Accordingly, any clock jitter of the sampling clock at the A/D converter introduced by communication channel 110 physical medium, or otherwise, may result in a time-variant interference channel. An adaptive interference canceller module may be employed to eliminate or substantially suppress the time-variant interference channel, for example. The various embodiments illustrated and described herein, provide an adaptive interference canceller module as part of receivers 600A, B, for example, to adaptively filter the noise reference input to maximally match and subtract out noise or interference from a primary input signal (e.g., desired signal plus noise). Adaptation may be partially implemented using any number of well-known methods, such as least mean squares (LMS), recursive least squares (RLS), Fast RLS, and so forth. The embodiments, however, are not limited to these adaptation examples.

To meet increasingly stringent communication system performance requirements, it may be necessary to perform improved interference cancellation. Various adaptive interference canceller modules may be employed to cancel or substantially suppress one or more of the various types of interference described previously.

The following embodiments are described with reference to near-end 212 network interface 102A and receiver 600A-1, although the principles may be applied to any of the receivers 600A-1-n, 600B-1n in system 100. Throughout this description, an interference canceller module may refer to any interference canceller modules such as, for example, near-end interference or far-end canceller module, a NEXT interference, and/or FEXT canceller module, a FEXT interference canceller module, among others, to cancel near-end and far-end interference signals 208, 210, NEXT interference signals 216, and/or FEXT interference signals 218. Although some embodiments may be described in the context of interference or suppression of interference signals, the embodiments of interference canceller module described and illustrated herein are not limited to an interference canceller and may be employed in a variety of interference signal canceling techniques and/or implementation to cancel additional interference signals that may arise in system 100, for example.

FIG. 3 is a diagram of one embodiment of an apparatus 300 with an interference canceller module 360. Interference canceller module 360 may be used in communications system 100. Interference canceller module 360 may be implemented as part of, or separate from, receivers 600A-1-n, 600B-1-n, that may be used in respective PHY units 104A-1-n, 104B-1-n comprising transceivers 202A-1-n, 202B-1-n. Transceivers 202A-1-n, 202B-1-n each may comprise respective transmitters (T) 204A-1-n, 204B-1-n and receivers (R) 600A-1-n, 600B-1-n, which may be coupled to respective communication channels 110-1-n via respective hybrid units 212A-1-n, 212B-1-n.

As shown in FIG. 3, transmitter 204A-1 of transceiver 202A-1 may receive information to communicate to transceiver 202B-1 via hybrid 212A-1 and communications channel 110 physical medium. A local clock 304 may be coupled to transmitter 204A-1 and an analog phase shifter 306. An analog-to-digital (A/D) converter 310 may be coupled to an output of hybrid 212A-1, and an output of analog phase shifter 306. A timing recovery module may be coupled to analog phase shifter 306 to provide timing recover commands to analog phase shifter 306. A summer 312 may be coupled to an output for A/D converter 310, and an output from an interpolator 318 of interference canceller module 360. Outputs for summer 312 may be coupled to timing recovery module 308 and receiver 600A-1.

In various embodiments, interference canceller module 360 may comprise an interference canceller 316 and an interpolator 318. Interference canceller 316 may comprise a digital interference canceller arranged to perform interference cancellation or suppression, for example. Interpolator 318 may be arranged to construct new data points from a discrete set of known data points, such as timing recover commands, for example. Interference canceller module 360 may utilize interference canceller 316 and interpolator 318 to perform interference cancellation of interference signals in transceiver 202A-1. Furthermore, interference canceller module 360 may perform adaptive interference cancellation of interference signals using adaptation module 320, for example. Adaptation of interference canceller module 360 may be performed using interference reference signal 350 received via interference channel 208, for example, and possibly other input signals as well (e.g., an equalizer input signal). Interference canceller module 360 may be arranged, for example, to cancel interference reference signal 350.

In various embodiments, transceivers 202A-1, 202B-1 may operate in a full duplex mode over communication channel 110 physical medium. Operation in full duplex mode, however, may cause transmitter 204A-1 of transceiver 202A-1 to create an undesired interference signal that is communicated over interference channel 208 and received by receiver 600A-1 of transceiver 202A-1. Interference canceller 316 of interference canceller module 360 may be arranged to suppress or cancel the interference signal. In order to perform interference cancellation, interference channel 208 carrying the interference signal needs to be periodically sampled in order to acquire various characteristics of the interference signal.

In many cases, however, the sampling point constantly changes due to clock imperfections, analog imperfections, intentional changes of the sampling phase due to timing recovery operations, and other factors. For example, transceiver 202A-1 may need to implement a timing recovery technique so that a local clock 304 of transceiver 202A-1 is "locked" and tracks a remote clock 314 of transceiver 202B-1. In one embodiment, for example, timing recovery may be performed by adjustment of the sampling clock phase, such as the A/D clock for A/D converter 310, for example. Timing recovery is frequently necessary in systems using loop timing, both in Master and Slave modes, since the remote clock phase for remote clock 314 is constantly changing. As shown in FIG. 3, timing recovery module 308 may provide timing recovery command signals to analog phase shifter 306. The timing recovery command signals are typically discrete jumps applied through analog phase shifter 306. Since this causes a shift of phase between the transmitting clock and the receiving (e.g., sampling or A/D) clock, this effectively results in a constantly changing sampled interference channel.

Due to the time-variant characteristics of interference channel 208, it becomes necessary to constantly adapt interference canceller 316 in order to adjust to the changing sampled interference channel 208, in order to provide a suitable amount of interference cancellation or suppression for receiver 600A-1. Interference canceller 316 needs to be adapted in such a way that it holds a good estimation of the sampled interference channel 208. In conventional systems, the task of interference canceller adaptation to address the constantly changing interference channel is performed using adaptation of all the interference canceller taps to estimate the interference channel at the new sampling phase. Each timing recovery command signal causes a "jump" in the sampling phase, resulting in a "jump" of the sampled interference channel, leading to an abrupt jump of unsuppressed interference power. This unsuppressed interference power immediately introduces a higher amount of residual error into the system, thus degrading performance.

Various embodiments attempt to reduce or eliminate such abrupt errors, in part, by using the timing recovery information provided by timing recovery module 308. Timing recovery module 308 may output timing recovery command signals via timing recovery command signal 330 to interpolator 318. Interpolator 318 may apply this information onto the output for interference canceller 316 and, interpolate it to the new sampling phase to compensate for the phase shift in interference channel 208 due to the timing recovery command signals applied to analog phase shifter 306 thereby moving the A/D sampling phase.

In one embodiment, for example, interference canceller 316 may be adapted to changes in interference channel 208 using the timing recovery information provided by timing recovery module 308. Timing recovery module 308 may output a timing recovery command signal 330 representing timing recovery information to interpolator 318 of interference canceller module 360. Interpolator 318 may receive an interference canceller signal 322 from interference canceller 316. Interpolator 318 may also receive the output from interference canceller 316 in the form of interference canceller signal 322. Interpolator 318 may interpolate the timing recovery information onto interference canceller signal 322 to produce interpolated interference canceller signal 326, and thereby interpolating it to the new sampling phase. The interpolation operations may compensate for the phase shift in interference channel 208 due to the timing recovery command signals applied to analog phase shifter 306, which moves the A/D sampling phase. In some cases, the compensation of the timing recovery command signals may be timed so that it compensates for the entire interference canceller phase shift simultaneously. This effectively results in a stationary sampled interference channel.

The interference cancellation architecture shown in FIG. 3 provides several advantages. For example, interference canceller module 360 may provide enhanced performance as measured by interference suppression ability, tracking ability and amount of residual error in the system. In another example, interference canceller module 360 may reduce power requirements for the system. Although interpolator 318 does require additional hardware or software elements, the adaptation of a relative high number of interference canceller taps (e.g., approximately 1000 taps) and the associated flip-flop toggling in conventional systems consumes significantly higher power. This toggling is reduced to an almost zero level since the amount of adaptation necessary after the compensation is substantially reduced. Using interpolator 318 to interpolate interference canceller signal 322 results in a majority of the adaptation and correction needed to compensate for changes in interference channel 208. In some cases, even when the signal interpolated does have some excess bandwidth, the interpolation may perform a majority of the correction task (e.g., approximately 95%). Any remaining correction (e.g., approximately 5%) may be adjusted using additional adaptation algorithms implemented with adaptation module 320, for example. Examples of appropriate adaptation algorithms may include LMS, RLS, Fast RLS, and so forth. The embodiments, however, are not limited to these adaptation examples.

In addition, the adaptation techniques utilized by apparatus 300 may also apply to systems where the transmitting clock may be connected to the timing recovery of another channel, such as the 10G BaseT slave mode, for example. In this case, it is the information of the difference between the transmitting clocks and the sampling clock which is passed to the timing recovery compensation mechanism.

Once interference canceller 316 produces interference canceller signal 322, and interpolator 318 interpolates the timing recovery command signals onto interference canceller signal 322, the interpolated interference canceller signal 326 may be provided to summer 312. Summer 312 operates to sum its input signals 324, 326 to produce output signal 328 to receiver 600A-1 to reduce or eliminate the interference signal carried by interference channel 208.

In addition to (or in lieu of) a timing-based interference cancellation architecture using an interpolator and timing recovery command signals, some embodiments may utilize a hybrid interference cancellation architecture to effectively reduce or eliminate interference such as interference signals in communication system 100. Various embodiments directed to the hybrid interference cancellation architecture may be described in more detail with reference to FIGS. 4-7.

Figure 4:
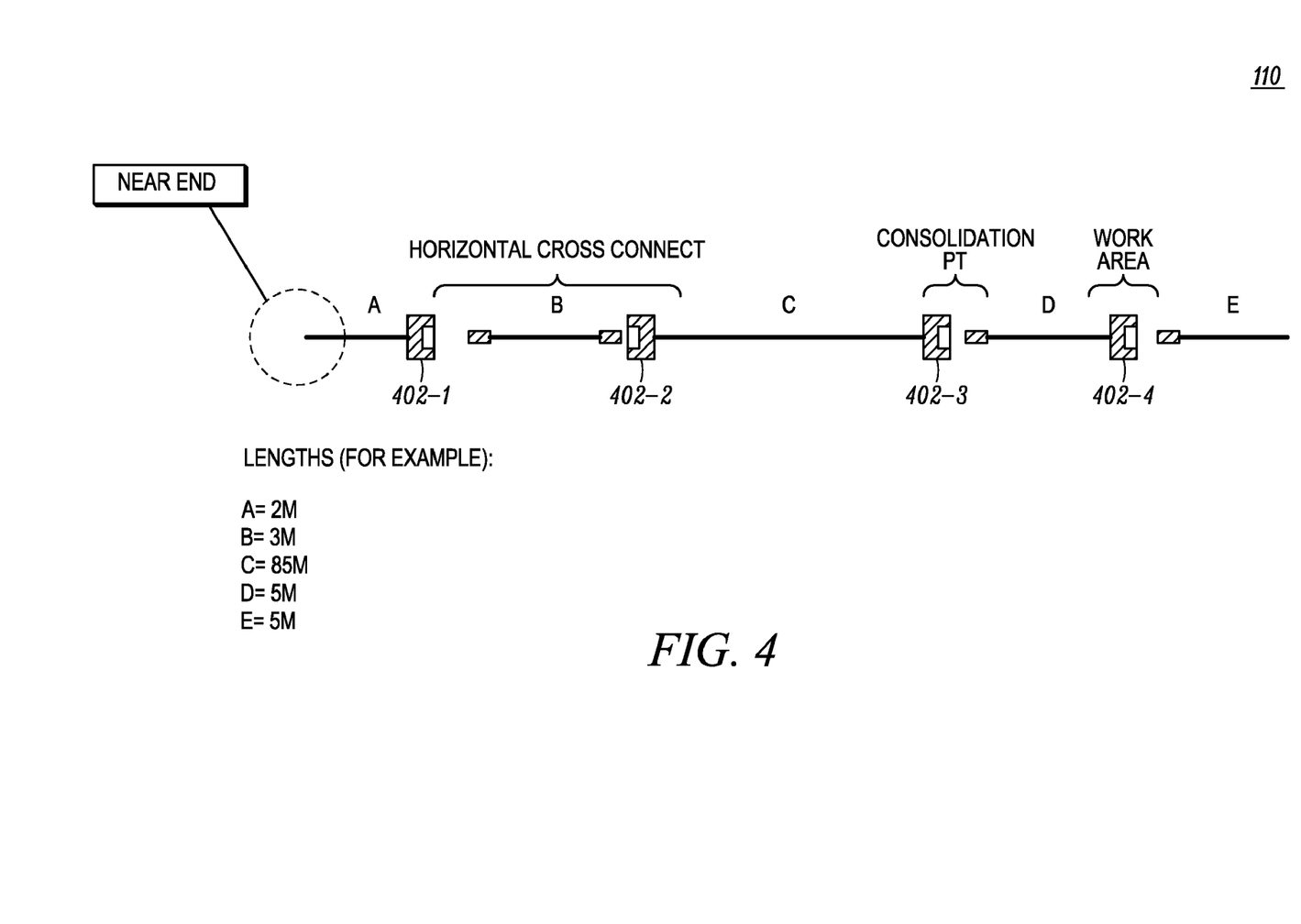
FIG. 4 illustrates one embodiment of a physical communication channel.

FIG. 4 illustrates one embodiment of a physical communication channel. In addition to a time-variant interference signal having a constantly changing sampling point, or in lieu of such a time-variant signal, interference channel 208 may also create a specific interference signal based on characteristics of its physical structure, such as communication channel 110 physical medium. A typical communication channel, such as communication channel 110 physical medium, may comprise a number of wired segments, patches, connectors, couplers, intermediate devices, and so forth. The unique physical characteristics of a given communication channel may create a corresponding interference signal that may be identified and specifically compensated for by a hybrid interference canceller.

FIG. 4 illustrates a more detailed example of communication channel 110 physical medium. FIG. 4 illustrates communication channel 110 physical medium for a 10G BaseT communication channel having four connectors. As shown in FIG. 4, communication channel 110 physical medium may have wired communication medium segments A-E each connected by respective connectors 402-1-4. Wired communication medium segments A-E may have varying lengths, where segment A comprises 2 meters, segment B comprises 3 meters, segment C comprises 85 meters, segment D comprises 5 meters, and segment E comprises 5 meters. It may be appreciated that the values, topology and communication medium are provided by way of example, and communication channel 110 physical medium may have any number of different compositions and elements and still fall within the scope of the embodiments.

Figure 5A:
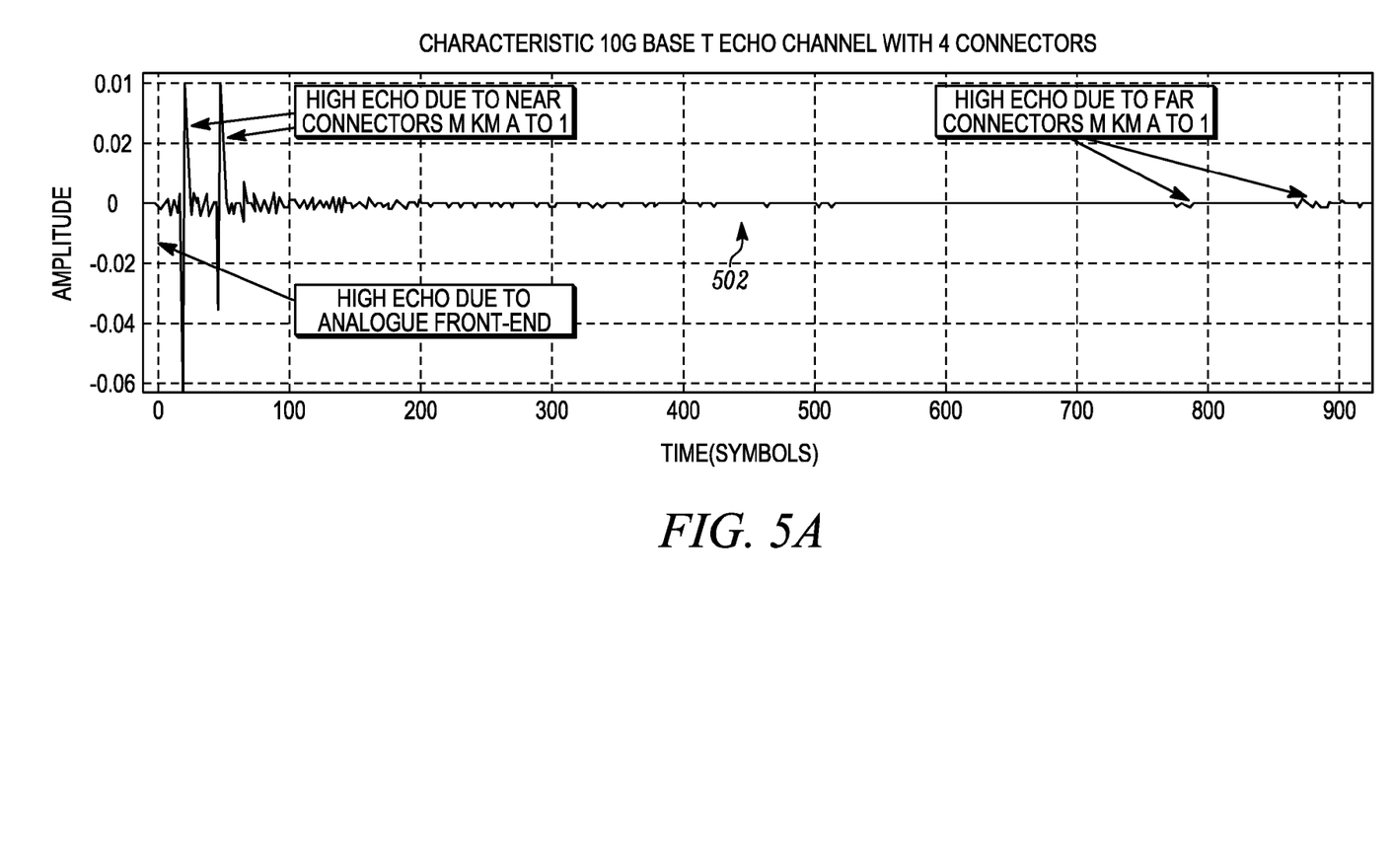
FIG. 5A illustrates one embodiment of a first graph of an interference channel.
Figure 5B:
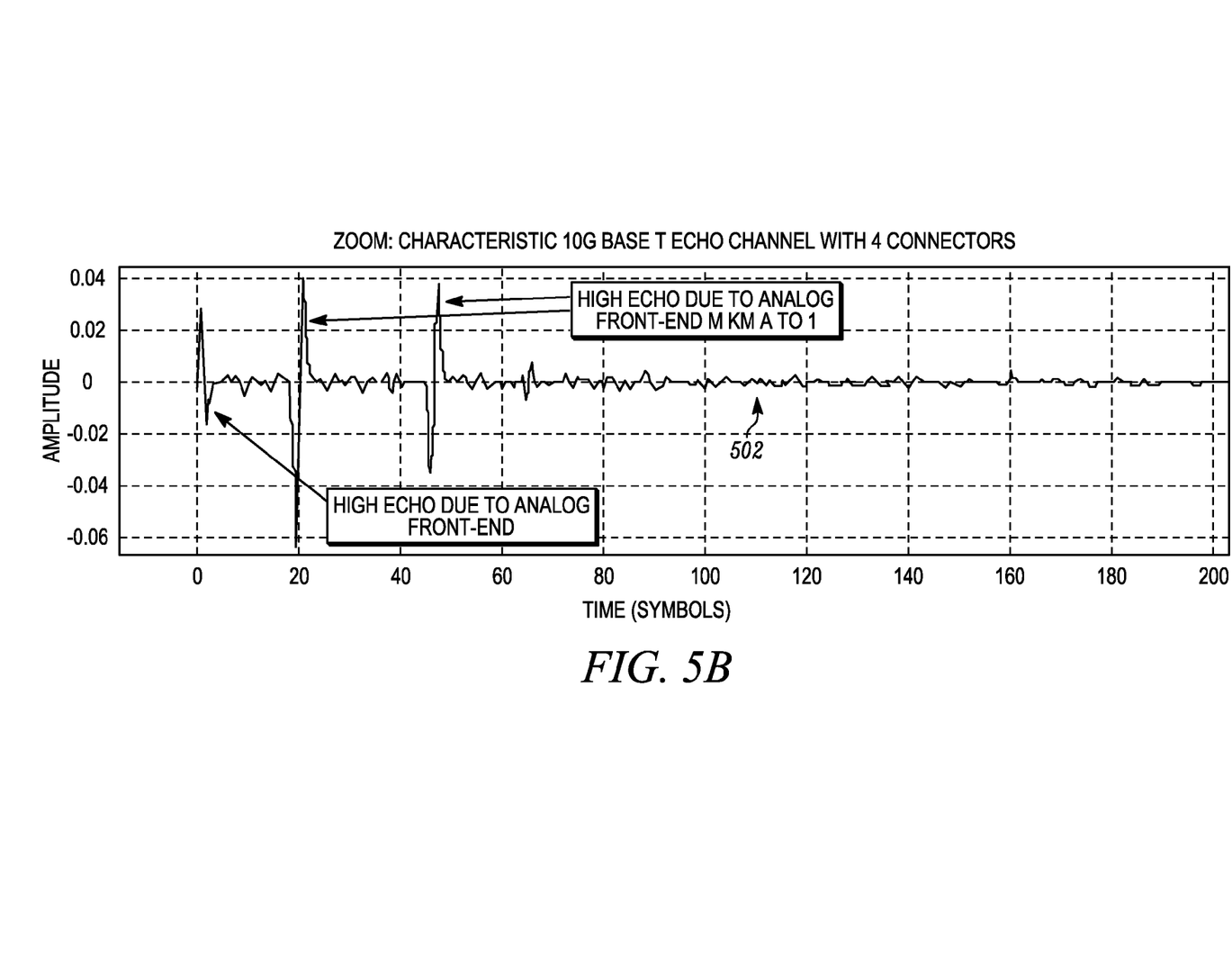
FIG. 5B illustrates one embodiment of a second graph of an interference channel.

FIGS. 5A and 5B illustrate embodiments of a first graph of an interference channel. FIGS. 5A and 5B illustrate a graph 500 showing a graph of an interference signal 502 corresponding to the unique physical arrangement of communication channel 110. FIG. 5A illustrates a time duration spanning 900 symbols, while FIG. 5B illustrates a more detailed illustration for the time duration spanning 0-200 symbols, while focusing particularly on the time period between 0-100 symbols.

Interference or interference cancellation is typically performed using either a time-domain interference cancellation technique or a frequency-domain interference cancellation technique. As shown in FIGS. 5A and 5B, the resulting interference signal 502 is of a relatively long duration. Further, interference signal 502 may have a number of highly energetic reflections due to mismatches at each connector 402-1-4, and other sources as well. As a result, interference signal 502 may require a relatively large number of interference cancellation taps to adequately perform a desired level of interference cancellation. Implementing such a large number of taps in a time-domain interference canceller, however, may consume excessively high amounts of power. For example, power requirements for a 10G BaseT system having an interference signal similar to interference signal 502 have been estimated to be approximately 10 W or higher. Implementing an interference canceller in the frequency domain may potentially reduce the required power by a factor of at three or more. Frequency-domain interference cancellers, however, typically utilize block processing. Consequently, the adaptation of a frequency domain interference canceller adaptation is typically limited to once every block, as compared to once every symbol time in the time domain approach. Performing adaptation on a block basis (e.g., a block size of 128 symbols) may reduce the adaptation ability of the interference canceller and its ability to suppress interference. Various embodiments attempt to gain the advantages of both time-based interference cancellation techniques and frequency-domain interference cancellation techniques by combining both techniques into a hybrid time-frequency interference canceller architecture, and applying the appropriate technique to various parts of an interference signal.

A hybrid time-frequency interference canceller architecture may provide several advantages. For example, a hybrid time-frequency interference canceller architecture may tailor a hybrid time-frequency solution to address the characteristic interference channel for a communication systems, such as a 10G BaseT interference channel. In addition, a hybrid time-frequency interference canceller architecture presents a solution which offers a low power solution while maintaining high performance (e.g., adaptive interference cancellation abilities). This may be accomplished with a minimal power penalty of as little as 5 sparse time-domain interference cancellation banks, for example. A hybrid time-frequency interference canceller architecture also provides an advantage in reduced convergence time compared to conventional interference canceller solutions. The reason is that in the first stage only a relatively small number of taps are converging at the same time, thereby avoiding excessive self-generated error, and allowing the later convergence of the massive amount of taps to be executed at a much better SNR. Finally, a hybrid time-frequency interference canceller architecture offers reduced power requirements and enhanced performance as measured by interference suppression ability, adaptation ability, convergence time and amount of residual error in the system.

Figure 6:
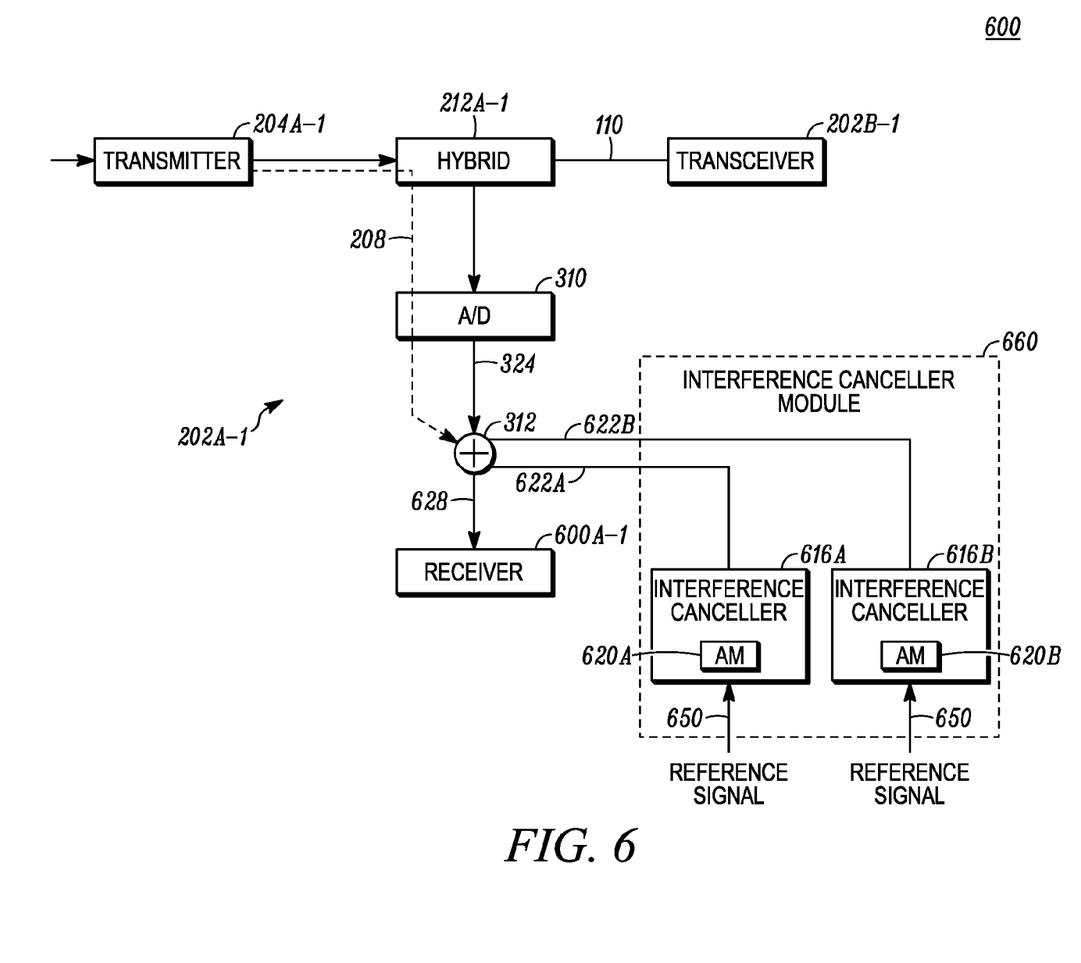
FIG. 6 illustrates one embodiment of a second apparatus.

FIG. 6 illustrates one embodiment of a second apparatus. FIG. 6 is a diagram of an apparatus 600 with an interference canceller module 660. As with interference canceller module 360, interference canceller module 660 may be implemented as part of, or separate from, receivers 600A-1-n, 600B-1-n, that may be used in respective PHY units 104A-1-n, 104B-1-n comprising transceivers 202A-1-n, 202B-1-n. Transceivers 202A-1-n, 202B-1-n each may comprise respective transmitters (T) 204A-1-n, 204B-1-n and receivers (R) 600A-1-n, 600B-1-n, which may be coupled to respective communication channels 110-1-n via respective hybrid units 212A-1-n, 212B-1-n.

In various embodiments, apparatus 600 shares some common elements with apparatus 300, such as elements 202A-1, 204A-1, 212A-1, A/D 310, summer 312, and signal 324. By way of contrast, interference canceller module 660 may comprise a pair of interference cancellers 616A, 616B, each with respective adaptation modules 620A, 620B. Interference cancellers 616A, 616B may have respective outputs coupled to summer 312. Interference cancellers 616A, 616B may receive as input interference reference signals 650.

In various embodiments, interference canceller module 660 may be based on a hybrid time-frequency interference canceller architecture, where a frequency-domain interference canceller 616B is used to cover the large duration of the interference channel, thus enjoying the benefits of a lower power canceller, and a smaller number of time-domain interference cancellation taps from a time-domain interference canceller 616A are used to address the areas where the interference channel has higher energy. The areas with the high energy may deserve special attention, since a small error in one of the interference canceller taps in that region results in a disproportionately higher residual error after cancellation, therefore it is desirable to adapt these areas at the highest rate possible. The degradation caused by adaptation of these areas only once every block (e.g. once every 128 symbols vs. once every symbol) using a frequency-domain interference canceller would be rather severe. On the other hand, the degradation caused by adaptation of the hybrid time-frequency interference canceller addressing the other areas of the interference channel once every 128 clocks is negligible.

In one embodiment, for example, apparatus 600 may comprise time-domain interference canceller 616A to receive an interference reference signal 650 and produce a time-domain interference canceller signal 622A during a first time period. Time-domain interference canceller 616A may have multiple banks of time-domain interference cancellation taps to be used for higher energy reflections of an interference signal (e.g., interference signal 502). Apparatus 600 may further comprise frequency-domain interference canceller 616B to receive interference reference signal 650 and produce a frequency-domain interference canceller signal 622B during a second time period. Frequency-domain interference canceller 616B may have multiple banks of frequency-domain interference cancellation taps to be used for lower energy reflections of the interference signal. Interference cancellers 616A, 616B may each further have respective adaptation modules 620A, 620B to perform adaptive interference cancellation.

It is worthy to note that some embodiments are described in the context of a 10G BaseT system, where the duration of the interference channel is typically long (e.g., approximately 1000 symbols) and there are at most 4 connectors 402-1-4 in the system, creating the large mismatch and the resulting characteristic interference channel as described in FIGS. 5A and 5B. Nevertheless, the embodiments can be applied to any communication system with similar characteristics. Furthermore, although interference canceller module 660 is shown with two interference cancellers 616A, 616B, interference canceller module 660 may be implemented with more or less interference cancellers as desired for a given implementation. The embodiments are not limited in this context.

With reference to FIGS. 5A and 5B, interference canceller module 660 may comprise interference canceller 616A implemented as a time-domain interference canceller having multiple banks of time-domain interference cancellation taps. For example, time-domain interference canceller 616A may be implemented with 5 banks of time-domain interference cancellation taps, each bank having approximately 12 contiguous taps. Based on the energy of interference signal 502 as illustrated in FIGS. 5A and 5B, the time-domain banks may be associated or used for the higher energetic reflections of interference signal 502. This may be accomplished, for example, by setting the delay so that the time-domain bank covers the larger slope areas of interference signal 502.

In one embodiment, the energy reflections of interference signal 502 may be measured and/or compared with a defined threshold value. A determination may be made as to whether to use the time-domain banks of time-domain interference canceller 616A based on the comparison results. For example, if the comparison result is higher than the defined threshold, then interference cancellation may be performed by time-domain interference canceller 616A. If the comparison result is lower than the defined threshold, then interference cancellation may be performed by frequency-domain interference canceller 616B. If the comparison result is equal to the defined threshold, then either interference canceller 616A, 616B may be used as desired for a given implementation.

To begin operations, the time-domain interference cancellation taps of time-domain interference canceller 616A may be trained first, thereby adapting the canceller taps to each symbol. The frequency-domain interference cancellation taps may then be turned on, where adaptation of the canceller taps are performed each block (e.g., each 128 symbols), thereby leaving the time-domain adaptation for each symbol.

Figure 7:
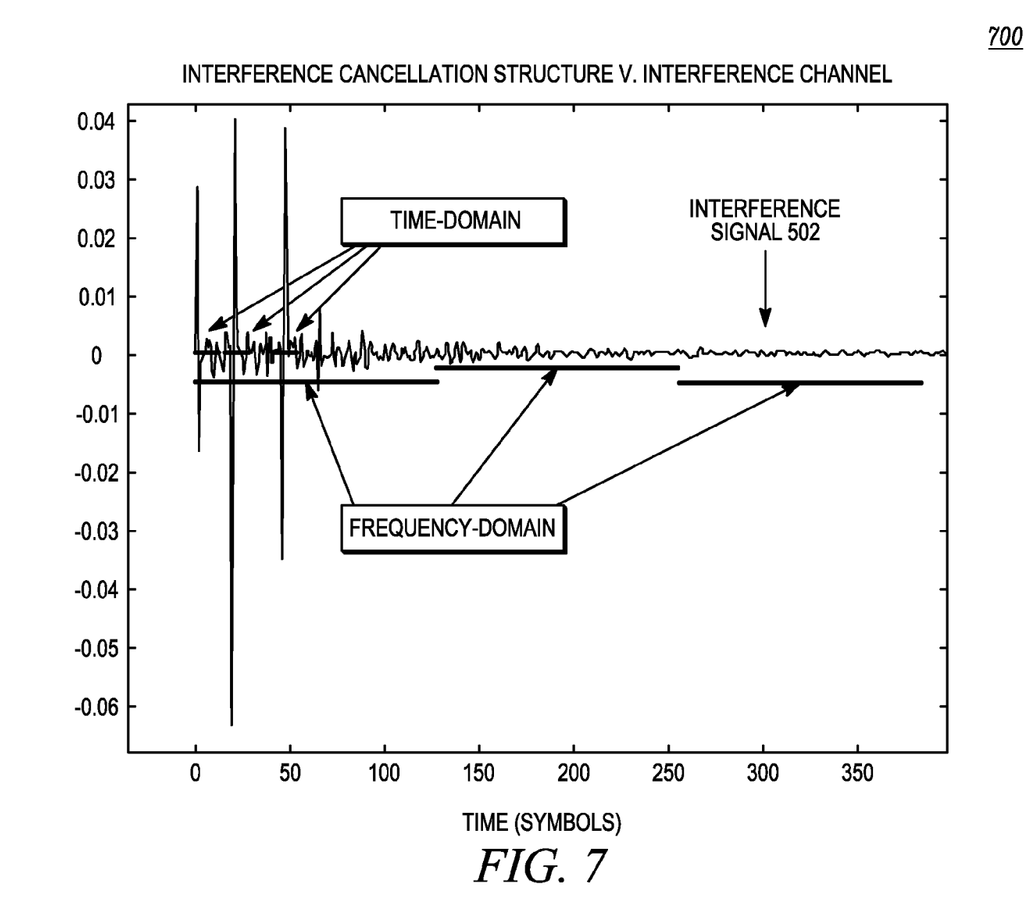
FIG. 7 illustrates one embodiment of a third graph for an interference channel.

FIG. 7 illustrates one embodiment of a third graph for an interference channel. FIG. 7 illustrates a graph 700 of the same interference signal 502 as shown in FIGS. 5A and 5B with markers identifying which portions of interference signal 502 are processed using time-domain interference canceller 616A and frequency-domain interference canceller 616B. In one embodiment, for example, identification may be accomplished by placing the transmitted series into interference cancellers 616A, 616B and using them as a correlator. Even though the series is not necessarily a pseudo-noise (PN) sequence, its autocorrelation properties are sufficient to identify the positions of the highly energetic reflections in interference channel 208. The absolute values of the correlator output may be compared, and the result compared to a threshold. The comparison results may be used to determine the appropriate positions for the time-domain banks.

In various embodiments, apparatus 300 and apparatus 600 may be shown with a limited number of elements. In implementation, both may include more or less elements as desired for a given implementation. For example, receivers 600A, 600B may also comprise receiver analog front end electronics coupled to line interface 114A, 114B to receive receiver input signals via communication channel 110 physical medium. Receiver analog front end electronics may perform signal conditioning on receiver input signal in accordance with conventional practices. Receivers 600A, 600B may further comprise an A/D converter coupled to the receiver analog front end electronics to receive the incoming signals. The A/D converter converts incoming signals into a stream of digital samples. Receivers 600A, 600B also may comprise an automatic gain control (AGC) circuit (or block) which is coupled to the A/D converter to receive the stream of digital samples output by the A/D converter. The AGC circuit may operate in accordance with conventional principles and, as a part of its conventional operation. Further, receivers 600A, 600B may include one or more equalizers coupled to the analog front end electronics and the A/D converter. For example, an equalizer may be implemented as a high-pass filter (HPF). The equalizer may be a finite impulse response (FIR) filter implemented as an adaptive feed forward equalizer (FFE), and in combination with other components, may operate to equalize equalizer input signal 316 to reduce or substantially eliminate ISI. Adaptive FFE, for example, may adapt equalizer characteristics it applies to equalizer input signals on the basis of interference signals 350, 650. In addition, receivers 600A, 600B may also comprise one or more decision elements, such as a slicer coupled to the output of the equalizer. The slicer may operate in accordance with conventional principles to produce a decision symbol and a slicer error signal as output signals. The decision symbol may reflect a filtered and/or equalized version of the equalizer input signal and may contain the data to be recovered from a receiver input signal. The slicer error signal may be an error signal that indicates a deviation of the equalizer input signal from a pre-determined ideal signal profile of the received input signal. The decision symbol and slicer error signal may be provided to MAC unit 106 for further processing. The above-described elements are provided by way of example, and receivers 600A-1, 600B-1 may also implement more or less elements as desired for a given implementation. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
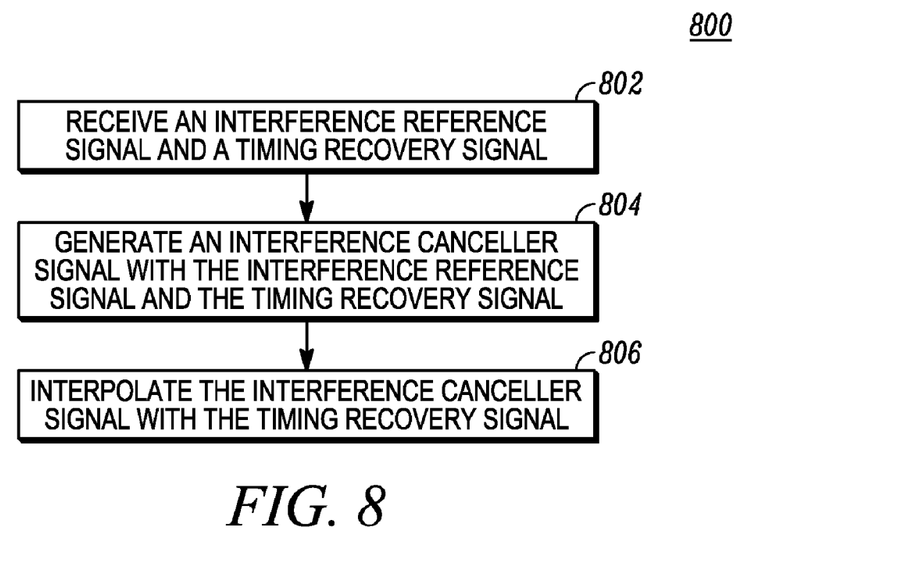
FIG. 8 illustrates one embodiment of a first logic flow.

FIG. 8 illustrates one embodiment of a first logic flow. FIG. 8 illustrates a logic flow 800. Logic flow 800 may be representative of the operations executed by one or more embodiments described herein, such as apparatus 300, for example. As shown in logic flow 800, logic flow 800 may receive an interference reference signal and a timing recovery command signal at block 802. Logic flow 800 may generate an interference canceller signal with the interference reference signal and the timing recovery command signal at block 804. Logic flow 800 may interpolate the interference canceller signal with the timing recovery command signal at block 806. The embodiments are not limited in this context.

In one embodiment, for example, the interference canceller signal may be interpolated with the timing recovery command signal to produce an interpolated interference canceller signal with a new sampling phase. The embodiments are not limited in this context.

In one embodiment, for example, the interference canceller signal may be interpolated with the timing recovery command signal to compensate for a corresponding sampling phase shift for an interference channel. The embodiments are not limited in this context.

In one embodiment, for example, a digital input signal and the interpolated interference canceller signal may be summed to cancel an interference signal from the digital input signal. The embodiments are not limited in this context.

In one embodiment, for example, the timing recovery command signal may be generated to adjust a sampling clock phase for an analog phase shifter. The embodiments are not limited in this context.

Figure 9:
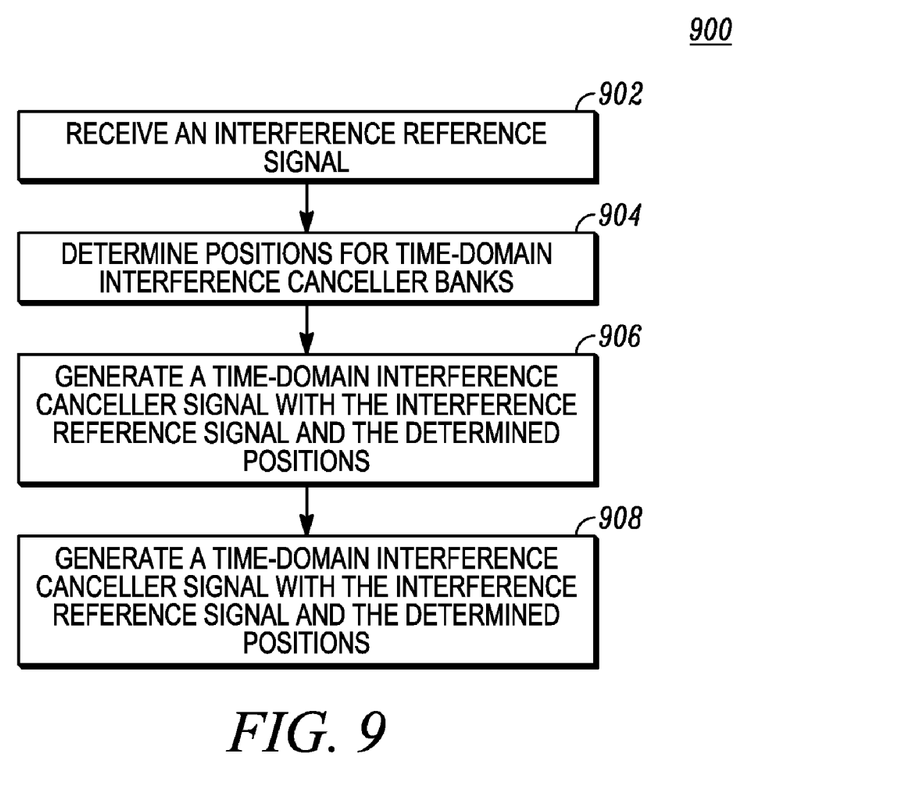
FIG. 9 illustrates one embodiment of a second logic flow.

FIG. 9 illustrates one embodiment of a second logic flow. FIG. 9 illustrates a logic flow 900. Logic flow 900 may be representative of the operations executed by one or more embodiments described herein, such as apparatus 600, for example. As shown in logic flow 900, logic flow 900 may receive an interference reference signal at block 902. Logic flow 900 may determine positions for time-domain interference canceller banks at block 904. Logic flow 900 may generate a time-domain interference canceller signal with the interference reference signal and the determined positions at block 906. Logic flow 900 may generate a frequency-domain interference canceller signal with said interference reference signal at block 908. The embodiments are not limited in this context.

In one embodiment, for example, the outputs from the interference cancellers may be subtracted from a received signal to obtain a suppressed interference signal. The embodiments are not limited in this context.

In one embodiment, for example, a bank of time-domain interference cancellation taps may be associated with higher energy portions of an interference signal. The embodiments are not limited in this context.

In one embodiment, for example, a bank of frequency-domain interference cancellation taps with entire support, above a certain threshold, may be associated with an interference signal. The embodiments are not limited in this context.

In one embodiment, for example, a set of time-domain interference cancellation taps may be trained. A set of frequency-domain interference cancellation taps may also be trained together with the time-domain interference cancellation taps. An adaptation rate for the cancellation taps may be modified after the training, such as when in operating mode, for example. The embodiments are not limited in this context.

In one embodiment, for example, multiple banks of time-domain interference cancellation taps may be allocated. Multiple banks of frequency-domain interference cancellation taps, some of which overlap said time-domain interference cancellation taps, may further be allocated. A first set of time periods for an interference signal with higher energetic reflections, and a second set of time periods for said interference signal with residual energetic reflections above a defined threshold, where a portion of the first and second time periods overlap, may be identified. The banks of time-domain interference cancellation taps may be associated with the first time periods to generate the time-domain interference canceller signal, and the banks of frequency-domain interference cancellation taps may be associated with the second time periods to generate the frequency-domain interference canceller signal.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In various implementations, the various embodiments may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, FPGAs, ASICs, circuits, registers), software components (e.g., programs, subroutines, logic) and/or combination thereof. The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. An apparatus, comprising:
a timing recovery module to produce a timing recovery command signal;

an interference canceller to receive an interference reference signal and produce an interference canceller signal; and an interpolator to couple between said timing recovery module and said interference canceller, said interpolator to use said timing recovery command signal and said interference canceller signal and produce an interpolated interference canceller signal.

2. The apparatus of claim 1, said interference canceller to include an adaptation module to adapt said interference canceller signal.

3. The apparatus of claim 1, said interpolator to apply said timing recovery command signal to said interference canceller signal to interpolate said interference canceller signal to a new sampling phase.

4. The apparatus of claim 1, said interpolated interference canceller signal to compensate for a corresponding sampling phase shift of an interference channel.

5. The apparatus of claim 1, comprising:

an interface to couple to a communication channel physical medium; and a receiver to couple to said interface.

6. A method, comprising:

receiving an interference reference signal and a timing recovery command signal;

generating an interference canceller signal with said interference reference signal and said timing recovery command signal; and interpolating said interference canceller signal using said timing recovery command signal.

7. The method of claim 6, comprising interpolating said interference canceller signal using said timing recovery command signal to produce an interpolated interference canceller signal with a new sampling phase.

8. The method of claim 6, comprising interpolating said interference canceller signal using said timing recovery command signal to compensate for a corresponding sampling phase shift of an interference channel.

9. The method of claim 6, comprising summing a digital input signal and said interpolated interference canceller signal to cancel an interference signal from said digital input signal.

10. The method of claim 6, comprising generating said timing recovery command signal to adjust a sampling clock phase for an analog phase shifter.

11. An article comprising a machine-readable storage medium containing instructions that if executed enable a system to:

receive an interference reference signal and a timing recovery command signal;

generate an interference canceller signal with said interference reference signal and said timing recovery command signal; and interpolate said interference canceller signal using said timing recovery command signal.

12. The article of claim 11, comprising instructions that if executed enable the system to interpolate said interference canceller signal using said timing recovery command signal to produce an interpolated interference canceller signal that corresponds to a new sampling phase of an interference channel.

13. The article of claim 11, comprising instructions that if executed enable the system to interpolate said interference canceller signal using said timing recovery command signal to compensate for a corresponding sampling phase shift of an interference channel.

14. The article of claim 11, comprising instructions that if executed enable the system to sum a digital input signal and said interpolated interference canceller signal to cancel an interference signal from said digital input signal.

15. The article of claim 11, comprising instructions that if executed enable the system to generate said timing recovery command signal to adjust a sampling clock phase for an analog phase shifter.

\* \* \* \* \*